US007672683B2

United States Patent
Neilson

(10) Patent No.: US 7,672,683 B2
(45) Date of Patent: Mar. 2, 2010

(54) NON-INTERFERING MULTIPATH COMMUNICATION SYSTEM

(75) Inventor: Paul Christian Neilson, Salem, MA (US)

(73) Assignee: Adaptive Instruments Corp., Hudson, MA (US)

( * ) Notice: Subject to any disclaimer, the term of this patent is extended or adjusted under 35 U.S.C. 154(b) by 0 days.

(21) Appl. No.: 12/072,446

(22) Filed: Feb. 26, 2008

(65) Prior Publication Data

US 2008/0153528 A1    Jun. 26, 2008

Related U.S. Application Data

(63) Continuation of application No. 10/449,455, filed on May 30, 2003, now abandoned.

(51) Int. Cl.
*H04B 7/00* (2006.01)
*H04B 15/00* (2006.01)

(52) U.S. Cl. ............... 455/502; 455/41.2; 455/515; 370/350

(58) Field of Classification Search ........... 455/502, 455/509, 515, 516, 517, 41.1, 41.2, 422.1; 370/347, 348, 350, 312, 314, 330
See application file for complete search history.

(56) References Cited

U.S. PATENT DOCUMENTS

| 6,459,989 | B1* | 10/2002 | Kirkpatrick et al. ......... 701/215 |
| 6,473,410 | B1* | 10/2002 | Sakoda et al. ............... 370/330 |
| 6,901,066 | B1 | 5/2005 | Helgeson |
| 2001/0030956 | A1 | 10/2001 | Chillariga et al. |
| 2004/0090948 | A1 | 5/2004 | Forssell et al. |
| 2004/0209640 | A1* | 10/2004 | Urban et al. ............. 455/550.1 |
| 2005/0052287 | A1* | 3/2005 | Whitesmith et al. .... 340/825.72 |
| 2005/0271028 | A1 | 12/2005 | Proctor |

FOREIGN PATENT DOCUMENTS

| WO | WO 99/46745 | 9/1999 |
| WO | WO9946745 | * 9/1999 |

\* cited by examiner

*Primary Examiner*—Sujatha Sharma
(74) *Attorney, Agent, or Firm*—Choate, Hall & Stewart, LLP

(57) ABSTRACT

A non-interfering multipath communication technique establishes a base transmit and receive period for a variety of spaced apart transceiver devices of a base station and communicates between at least one field station and the base station through those transceiver devices; a period of the base station is allocated amongst the transceiver devices to maintain the non-interfering multipath communication between the at least one field station and the base station.

19 Claims, 8 Drawing Sheets

NON-INTERFERING MULTIPATH COMMUNICATION SYSTEM

RELATED APPLICATIONS

This application is a continuation of U.S. patent application Ser. No. 10/449,455 filed May 30, 2003 now abandoned, which is incorporated herein by reference.

FIELD OF THE INVENTION

This invention relates to a non-interfering multipath communication system.

BACKGROUND OF THE INVENTION

Monitoring and control systems such as used to supervise processing plants and manufacturing processes and machines have become a critical part of operations. A report of an unsafe or hazardous condition can shut down an entire facility operation resulting in huge costs and delays. Wired systems often use redundant conductor paths from the field station sensor/actuators to the base station to avoid incorrect signals or total loss of signals due to accident or failure. Wireless systems have become much more appealing due to their lower installation cost and ease of installation and redeployment. One problem with wireless and even wired systems is that if anything interferes with the delivery of the signal from the sensor/actuator transducer at a field station faulty reports or even worse no reports can precipitate a variety of unnecessary effort before the true situation can be determined. Redundancy is always a solution but often it adds to the complexity and power required as well as to the cost.

BRIEF SUMMARY OF THE INVENTION

It is therefore an object of this invention to provide improved non-interfering multipath communication system.

It is a further object of this invention to provide such an improved non-interfering multipath communication system which is simpler and more power efficient.

It is a further object of this invention to provide such an improved non-interfering multipath communication system which is more reliable, faster and more robust.

If it is a further object of this invention to provide such an improved non-interfering multipath communication system which continues communications between a field station and a base station even when some paths are blocked.

If it is a further object of this invention to provide such an improved non-interfering multipath communication system which provides redundancy at little cost compared to wired systems.

If it is a further object of this invention to provide such an improved non-interfering multipath communication system which simplifies the identification of the point of failure.

The invention results from the realization that a truly effective non-interfering multipath communication system can be achieved by establishing base transmit and receive periods for a plurality of spaced apart transceiver devices of a base station, communicating between at least one field station and the base station through the transceiver devices and allocating at least a transmit period of the base station amongst the transceiver devices to maintain non-interfering multipath communication between the at least one field station and the base station even when some paths are blocked.

This invention features a non-interfering multipath communication system including a base station having base transmit and receive periods and including a plurality of spaced apart transceiver devices. There is at least one field station for communicating with the base station through the transceiver devices during the periods. The base station includes a controller device for allocating the periods amongst the transceiver devices to maintain non-interfering multipath communication between the at least one field station and the base station.

In a preferred embodiment the base station may include a base clock circuit for defining the base transmit and receive periods, and the field station may include a field clock circuit for defining field transmit and receive periods and at least one of the clock circuits may generate a sync clock pulse to synchronize the clock circuits with each other. The field station and the transceiver devices may communicate by conductors or via electromagnetic radiation, such as rf. The field stations may include at least one of a sensor transducer and an actuator transducer. The controller device may include means for allocating the periods to the transceiver devices randomly or in a predetermined order.

The invention also features a non-interfering multipath communication method including establishing base transmit and receive periods for a plurality of spaced apart transceiver devices of a base station and communicating between at least one field station and the base station through the transceiver devices. A period of the base station is allocated amongst the transceiver devices to maintain non-interfering multipath communication between the at least one field station and the base station.

In a preferred embodiment there are established field transmit and receive periods for the field station and a sync pulse is generated to synchronize the clock circuits with each other. The transmit periods may be allocated to the transceiver devices randomly or in a predetermined order. There may be established field transmit and receive periods for the field station and there may generated a sync clock pulse to synchronize the clock circuits with each other.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
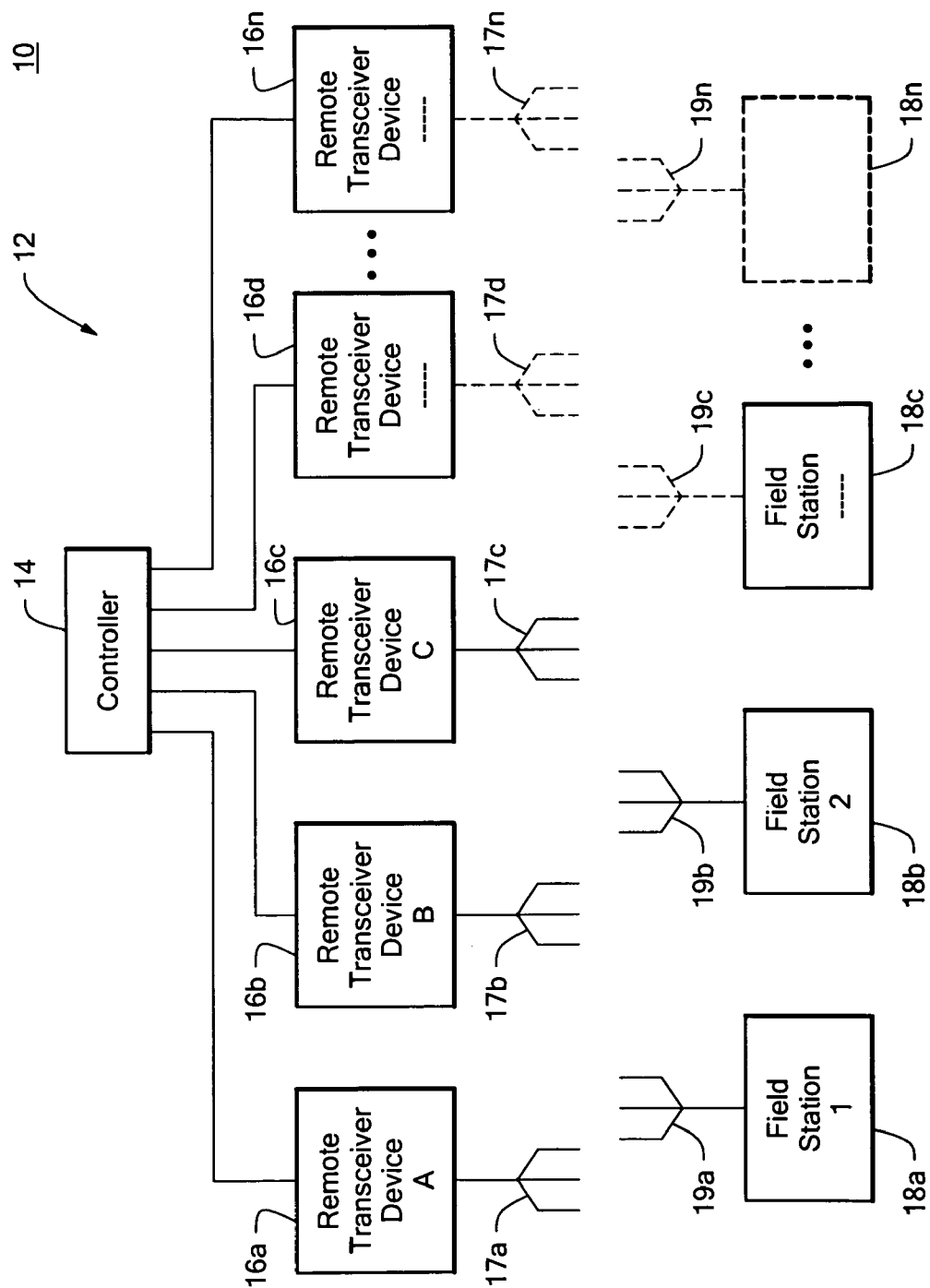
FIG. 1 is a schematic block diagram of a non-interfering multipath communication system including a base station with a number of remote spaced apart transceiver devices including a base station and a plurality of field stations.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

There is shown in FIG. 1 a non-interfering multipath communication system, 10, according to this invention, including the base station, 12, having a controller, 14, and plurality of remote transceiver devices, 16a, 16b, 16c, 16d, 16n, which communicate with a plurality of field stations, 18a, 18b, 18c, 18n, the communication between transceiver devices, 16a-16n and field stations 18a-18n may be rf as indicated by the antennas 17a-n and 19a-n, respectively, in FIG. 1 or it may be by solid conductors such as coaxial cable not shown for clarity.

Figure 2:
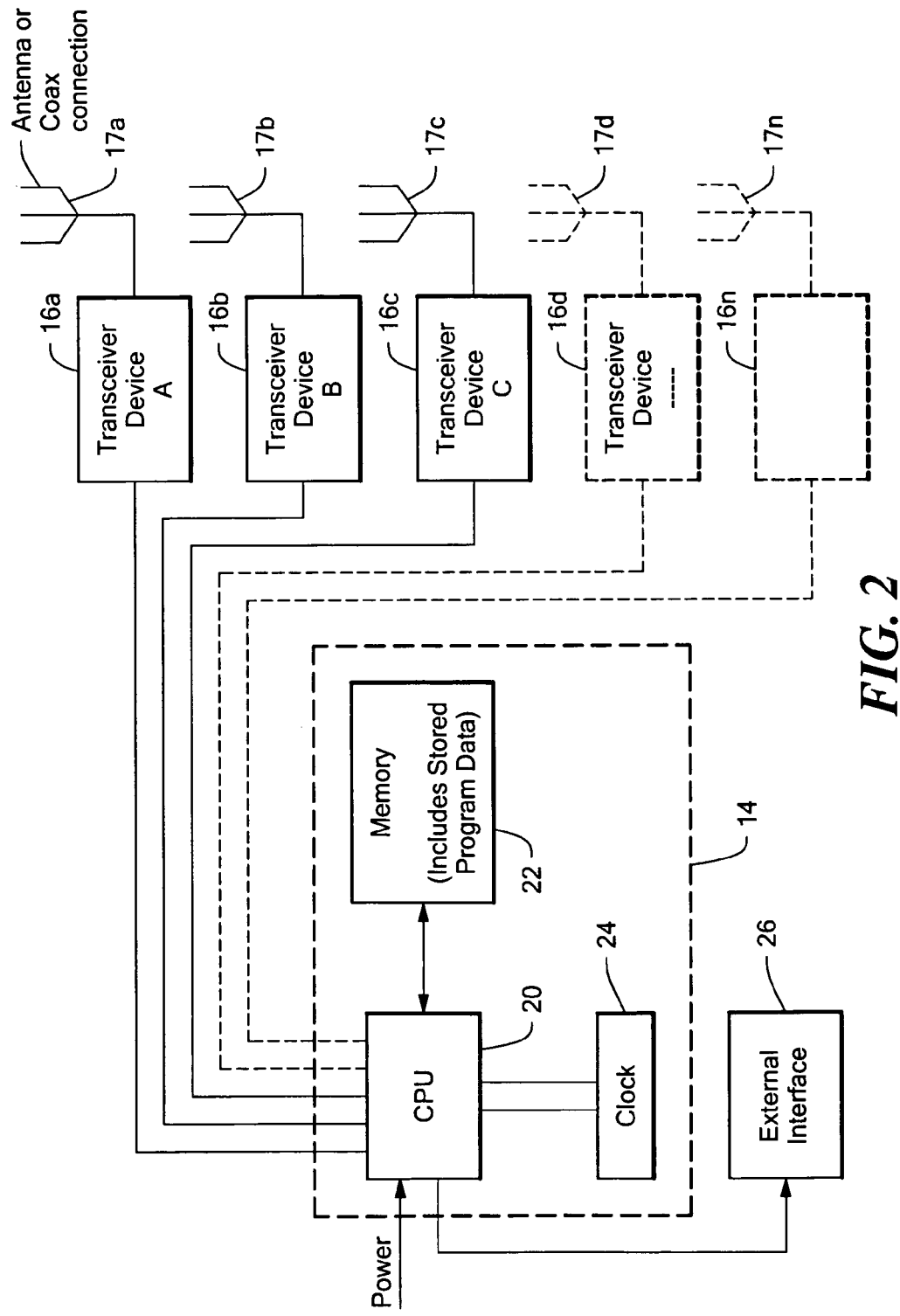
FIG. 2 is a more detailed schematic block diagram of the base station of FIG. 1.
Figure 3:
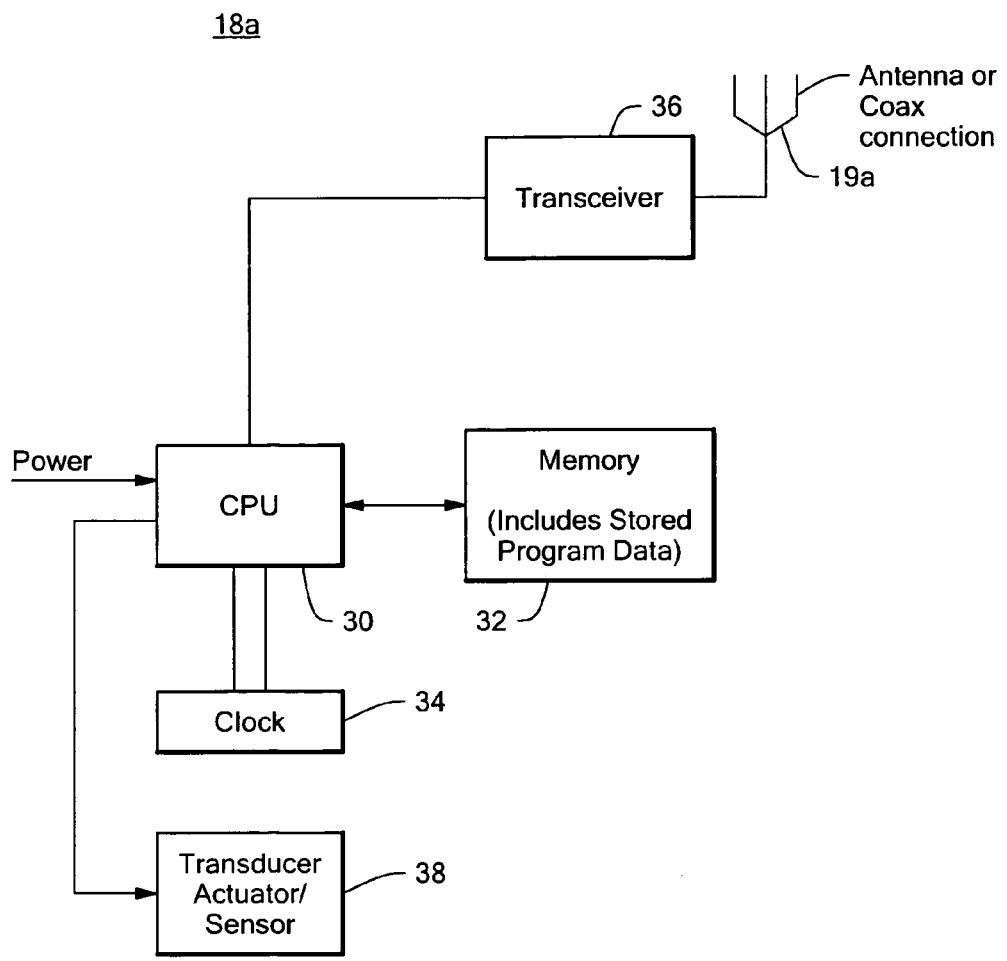
FIG. 3 is a more detailed schematic block diagram of the field station of FIG. 1.

Controller 14, includes CPU 20, FIG. 2, and memory 22, which includes stored program data. Also included in controller 14 is clock circuit 24 which operates in conjunction with the similar clock circuit in each of the field stations to synchronize the operation of the system. An external interface 26 is provided to enable the CPU 20 of controller 14, to transmit to and receive information from the world outside of system 10. Each field station as indicated by field station 18a, FIG. 3, also includes a CPU 30 and a memory 32 which includes stored program data and a clock circuit 34. A transceiver 36 with antenna 19a is provided to broadcast the information from CPU 30 and to receive information from the base station for CPU 30. Field station 18a also includes a transducer 38 which may include an actuator: for example, for operating a valve, switch, or a sensor for monitoring temperature, pressure, weight, ambient light, or any other parameter.

Figure 4:
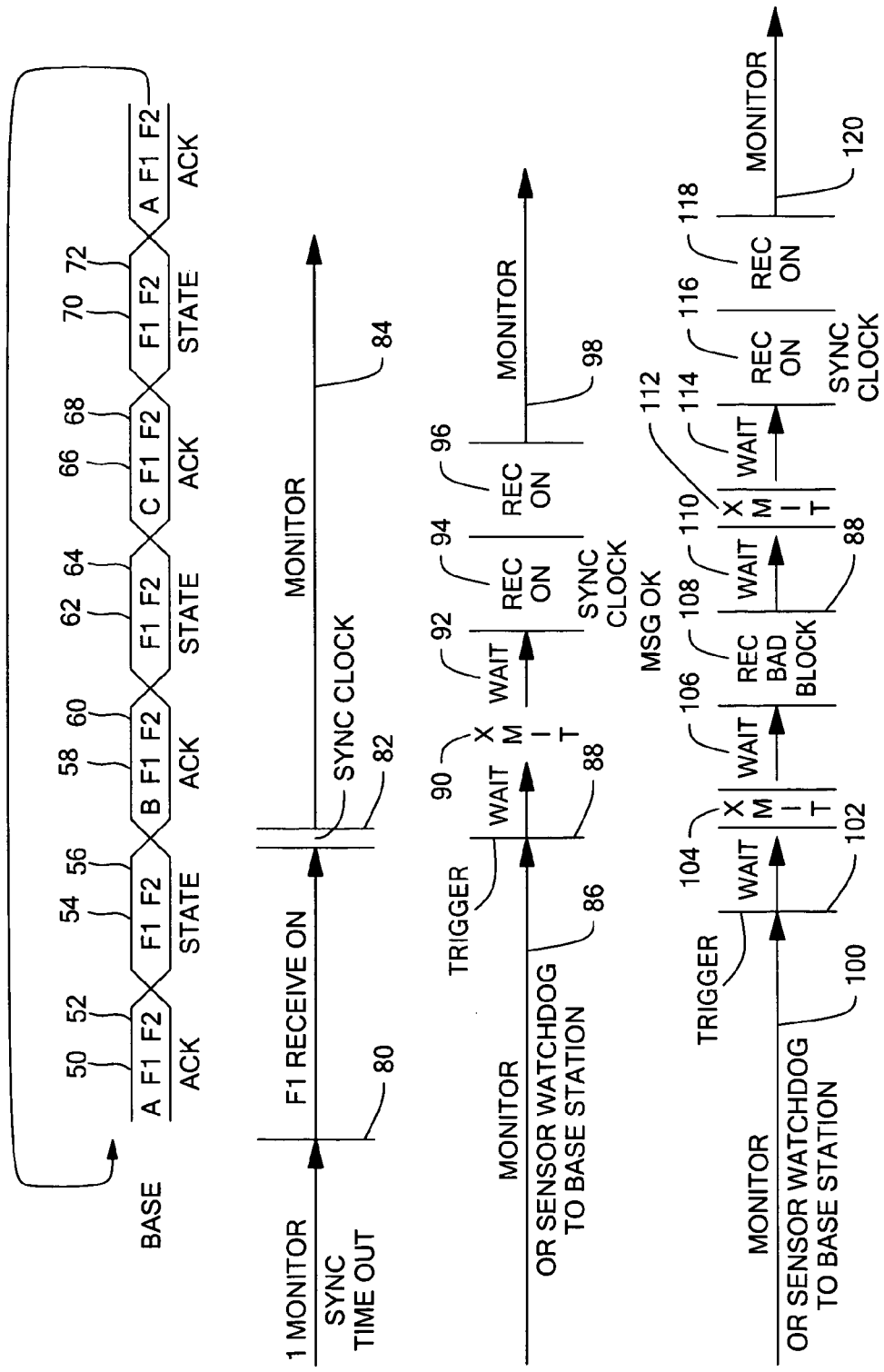
FIG. 4 is an illustration of the sequence of signals between base station transceiver devices and a field station.

In operation CPU 20 in controller 14 provides a succession of acknowledge sync signals from transceiver device 16a-16n which is delivered to the one or more field stations 18-18n. As shown in FIG. 4, the base station sends out an acknowledge sync signal at time slot 50 to the first field station 18a, at time slot 52 to the second field station 18b, and so on. For this example the acknowledge sync signal explanation of base station operation is just with respect to two field stations in order to simplify the description. After the acknowledge sync signal has been sent out from remote transceiver device A at times 50 and 52 to field stations 18a and 18b there is provided two corresponding time slots 54 and 56 during which field station 18a and 18b respectively, can respond with their status. Following this an acknowledgement sync signal will be sent out from remote transceiver device B, 16b to field station 18a in slot 58 and to field station 18b in slot 60. Following this the base station provides two time slots, 62 and 64 for field stations, 18a and 18b to respond with their status. Following this controller 14 enables remote transceiver device C, 16c to send an acknowledged synchronized signal in time slot 66 to field station 18a, and in time slot 68 to field station 18b. Following this, two time slots, 70 and 72, are provided for field station 18a and 18b, respectively, to respond with their status. Assuming there are only three remote transceiver devices A, B, and C, 16a, 16b, and 16c, the base station would then return to slots 50 and 52 where it would cause remote transceiver device A, 16a, again to send out acknowledge sync signals to field station 18a and 18b, respectively. Although the description is limited to just three transceiver devices A, B, C, namely, 16a, 16b, and 16c, and two field stations, field station 1 and field station 2, 18a, and 18b, this is not a necessary limitation of the invention, as any number of remote transceiver devices and field stations may be employed. In addition, although the acknowledge sync signals are sent out in order A, B, and C, this is not a limitation of the invention, as any order, including random order may be imposed by CPU 20 on the issuance of the acknowledge synchronize signals and the time slots for replies.

During the aforementioned operation of the base station, each field station as exemplified by the following description of field station 1, 18a, is going through one or more of the following operations. Assuming for purposes of discussion that we are discussing field station 1, 18a, it might be in a standby condition where it is monitoring the condition of the sensor for example. If during that monitoring period the field station determines that the synchronism of its clock 34 with the clock of the base station 24 is slipping, it will turn on and seek to find an acknowledge sync signal. Since it turns on at point 80, well after the acknowledge sync signal has been sent at 50 and 52, it awaits the next acknowledge sync signal at 58, 60, at which time it once again synchronizes its clock, 82, with the base station and returns to the monitoring state 84.

Alternatively, while the field station is in a monitoring condition, 86, it may be triggered by either a sensor event or a so-called "watch dog" event. A watch dog event occurs simply because the timer has been set to force the field station to communicate after a certain period of time, even if it has nothing to say, just to ensure that it is still operative. Thus, either a sensor event or a watch dog event triggers the field station at 88. Assuming at this point that it has synchronism between its clock circuit and that of the base station, it waits until its slot 62 becomes available, and transmits and then waits 92. Then turns its receiver on at 94 and receives an acknowledgement 96 that its transmission 90 has been properly received. It then returns to the monitor state 98.

Alternatively with the field station once again in a monitoring mode 100 waiting for a sensor event or a watch dog event, a trigger occurs at 102 after which the system waits for its slot to transmit at 104, and then waits again at 106. But now it receives nothing back at 108 because the path between this particular field station and the transceiver device, C, 16c, is blocked. At this point the field station waits again 110, then transmits once again in its own slot 112 and waits again 114. Now it receives an acknowledge sync from transceiver device, B, 16b, instead of C, 16c and since the message has been received at 118 the system goes back to the monitoring state at 120. Thus, any time the path between a field station and a particular one of the operative transceiver devices, 16a-16n is blocked, the field station will simply recycle and attempt to retransmit until it finds a path to at least one of the transceiver devices, 16a-16n, so it can communicate fully with the base station. Although the explanation of field station 1, 18a in FIG. 4, has been made with respect to it containing a sensor only, it may contain a sensor and an actuator or just an actuator. If the actuator is the active component, at the moment, then during those time slots such as 54, 56, 62, 64, 70, 72 when the station is sending back the sensor information, the converse would occur. That is, the base station, during those time slots would be sending information to cause the operation of the actuator.

Figure 5:
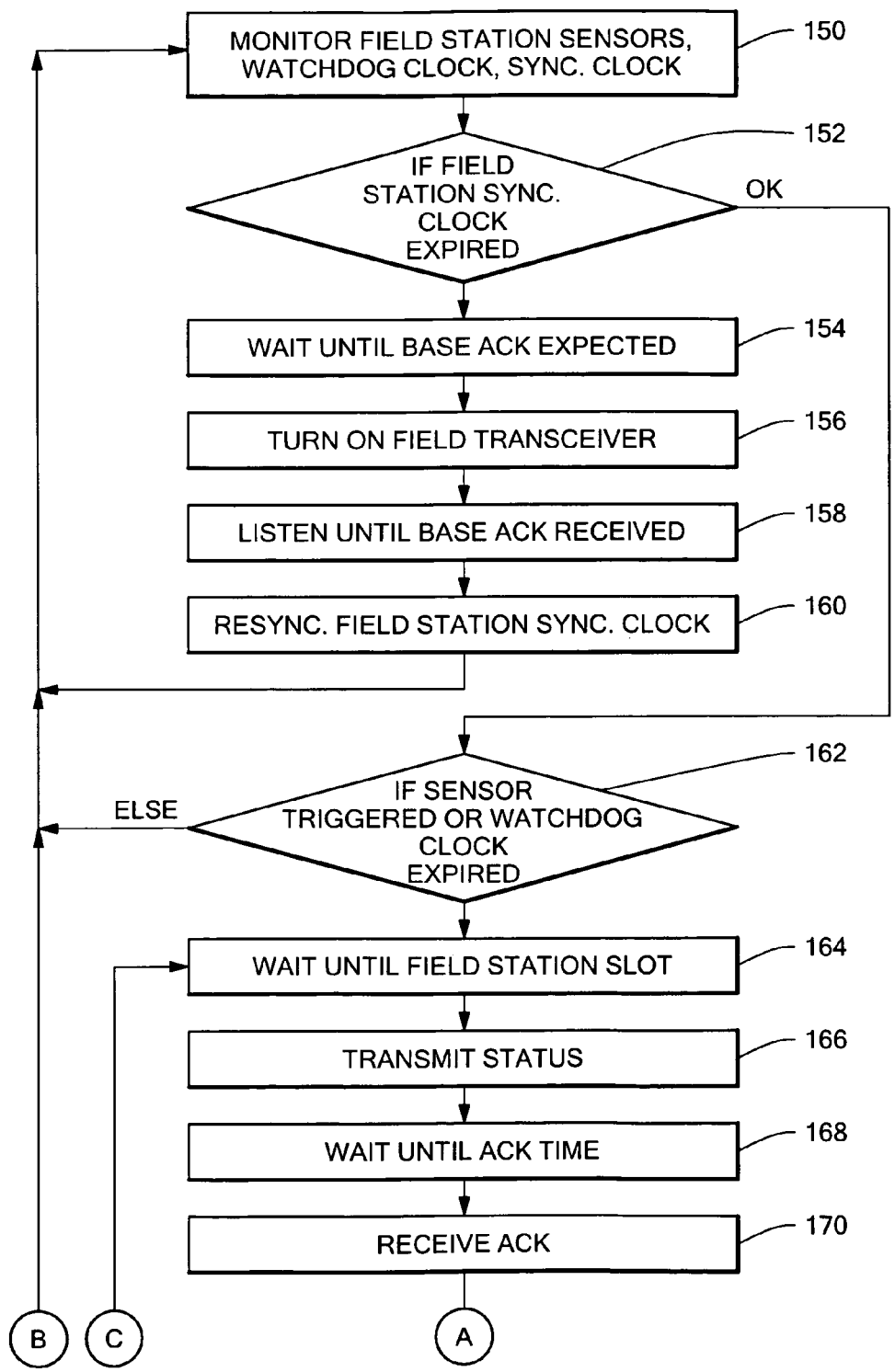
FIGS. 5 and 6 are a flowchart showing the method of operation of a field station according to this invention.
Figure 6:
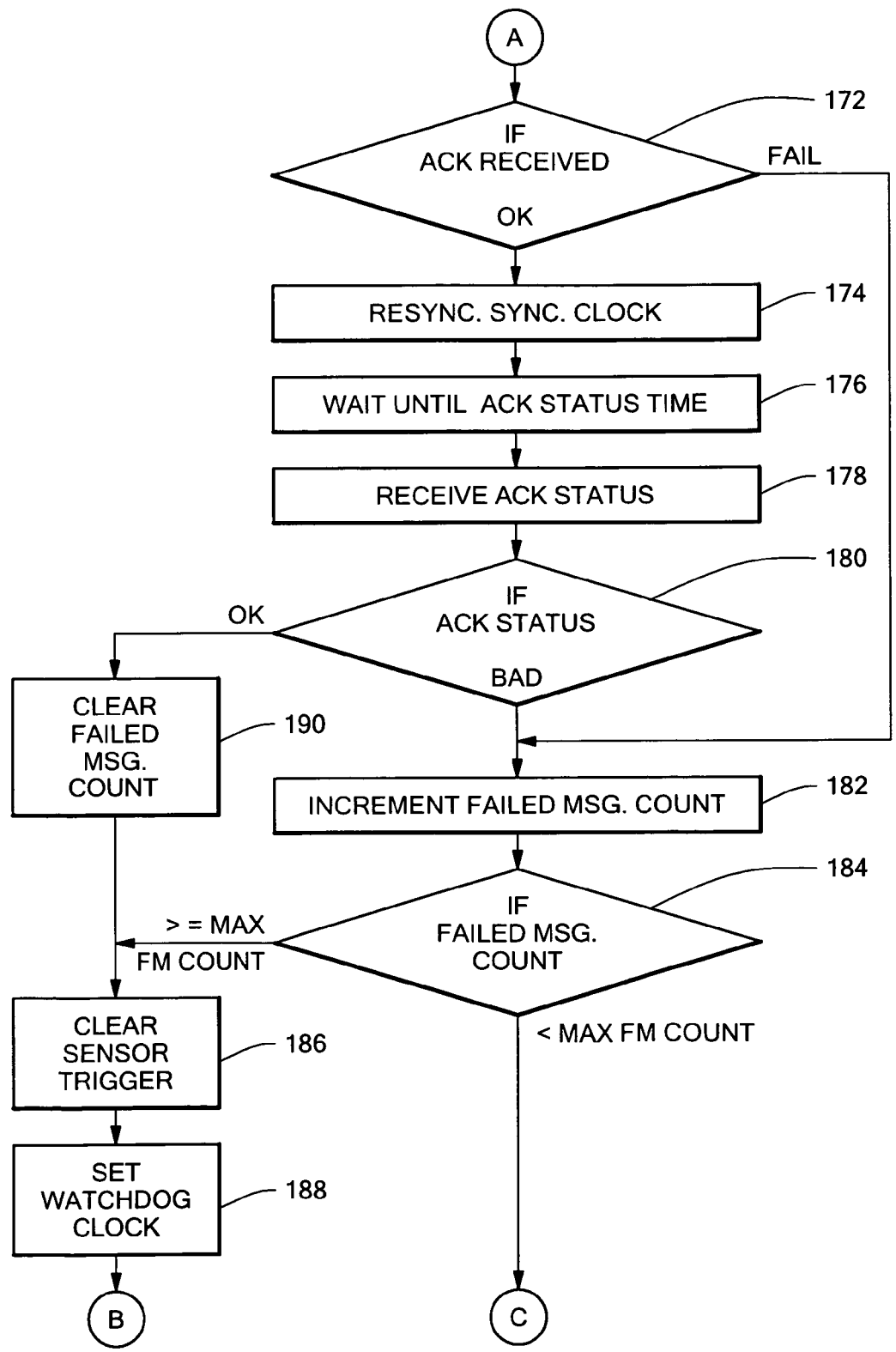
Figure 7:
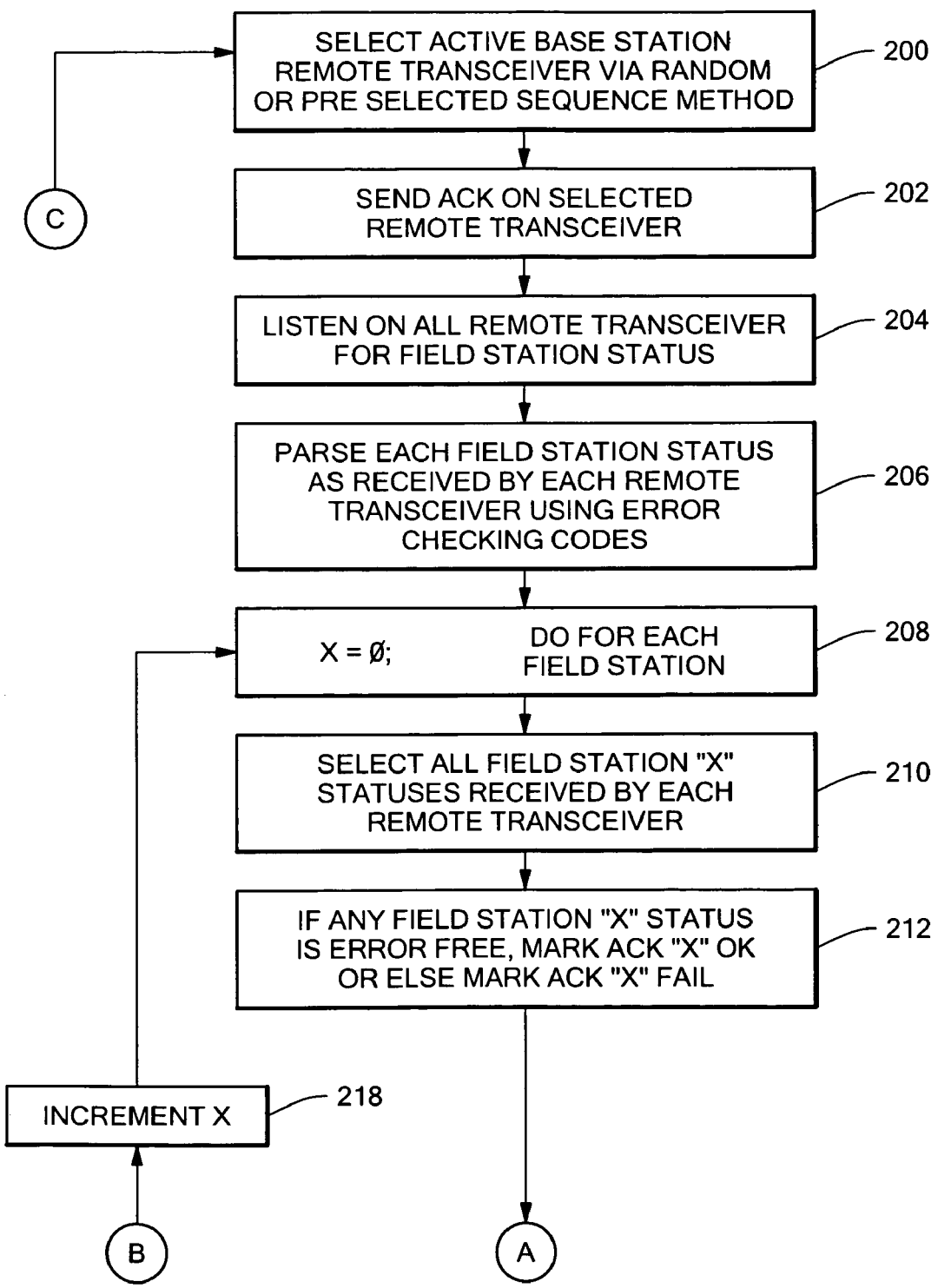
FIGS. 7 and 8 are a flowchart showing the method of operation of the base station transceiver device according to this invention.
Figure 8:
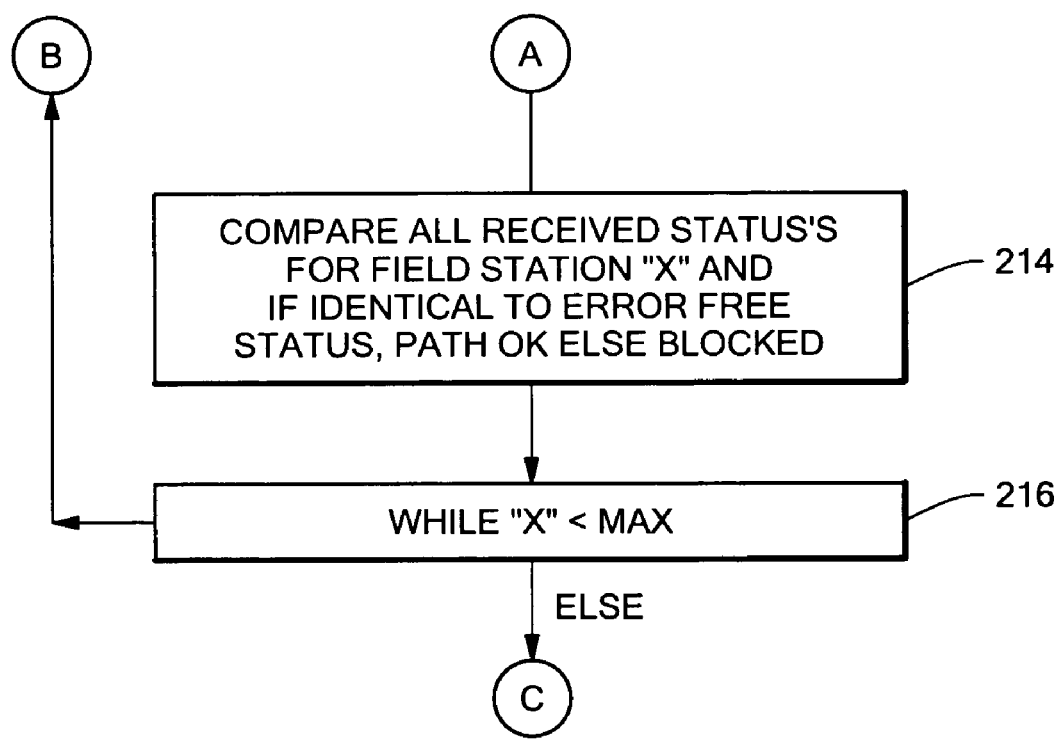

The operation and method of this invention is shown with respect to field stations in FIGS. 5 and 6 and with respect to the base station in FIGS. 7 and 8. Initially, the field station monitors the sensors, its watch dog clock and its own synchronous clock, 150, FIG. 5. If the field station synchronous clock has expired, 152, the field station will wait until the base acknowledge sync signal is expected 154 and then turn on the field transceiver 156. It then listens until the base acknowledge sync is received 158, where upon it re-syncs the field station sync clock, 160 and then returns to the monitoring of the field station sensor, watch dog clock and sync clock in step 150. If in step 152, the field station sync clock is ok, the system goes directly to step 162, where it queries whether the sensor has been triggered or the watch dog clock has expired. If it has, then the system waits till the field station slot is available, 164, transmits its status 166, waits until the acknowledge sync time occurs 168 and then receives the acknowledge sync 170. If the sensor trigger has not occurred and the watch dog clock is not expired in step 162, the system simply returns to monitoring the field station sensors, watch dog clock and sync clocks in step 150. After the acknowledge sync has been received in step 170 the query is made as to whether the acknowledge sync was received in good form, in step 172. If it was, the synchronous clock is resynchronized 174 and the system waits until the acknowledge sync status time occurs 176 and then it receives the acknowledge sync status in step 178. If then the acknowledge status is bad in step 180, or if the acknowledge receipt failed in step 172, the system increments the count of failed messages, 182. If in step 184 the failed message count equals the maximum, the sensor trigger is cleared 186 and the watch dog clock is reset 188. If in step 180 the acknowledge status is ok, then the failed message count is cleared in step 190. If in step 184 the failed message count is less than the maximum, the system returns to wait until the field station slot is available in step 164. After the watch dog clock is set in step 188 the system once again returns to monitor the field station sensors, watch dog clock and sync clock in step 150.

The method and operation of the base station begins with selecting the active base station remote transceiver via a random or pre-selected sequence method, 200 FIG. 7 and then sending an acknowledgement on the selected remote transceiver 202. The base station then listens on all remote transceivers for incoming field station status, 204. Each field station status is then parsed as received by each remote transceiver using error checking codes 206. Then for each field station 208 there is selected all the field station statuses received by each remote transceiver for each field station 210. If any particular field station status is error free, then an acknowledgement is marked ok, otherwise the acknowledgement is marked failed 212. Then all of the statuses received for that particular field station are compared and if they are identical to the error free status, the path is indicated as ok, otherwise this path may be identified as one which is blocked or in which there is some sort interference that needs to be addressed 214. The system then returns in step 216 to step 208 to perform this loop for the next field station, after first incrementing, in step 218, the number of the field station. If in step 216 the maximum number of field stations has been reached the system returns to step 200 where the base station selects a remote transceiver according to some random or pre-selected sequence method.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A non-interfering multipath communication system comprising:
    a base station in communication with one or more field stations;
    a plurality of transceivers spaced apart on the base station;
    a controller in the base station, configured to allocate transmit and receive periods to each transceiver of the plurality of transceivers, each transceiver configured to transmit a synchronization signal during an allocated transmit period; and
    a first field station of the one or more field stations configured to receive a synchronization signal transmitted by one transceiver of the plurality of transceivers during an allocated transmit period, and configured to transmit a status signal to the base station during an allocated receive period, wherein the base station compares at least two status signals received from the first field station to determine whether a path to the first field station is blocked.

2. The system of claim 1, wherein the controller is further configured to define the transmit and receive periods using a base station clock.

3. The system of claim 1, wherein the first field station further comprises a clock used to define transmit and receive periods, and at least one transceiver.

4. The system of claim 3, wherein the field station clock is configured to synchronize with the base station clock responsive to receiving a base station synchronization signal.

5. The system of claim 1, wherein the first field station further comprises a sensor.

6. The system of claim 1, wherein the controller is further configured to randomly allocate transmit and receive periods amongst the plurality of transceivers.

7. The system of claim 1, wherein the controller is further configured to allocate transmit and receive periods amongst the plurality of transceivers according to a predetermined order.

8. The system of claim 1, wherein the base station is further configured to establish a non-interfering multipath communication between one or more of the base station transceivers and the first field station.

9. The system of claim 1, wherein the first field station is further configured to retransmit a signal to a second base station transceiver after determining that a path to a first base station transceiver is blocked.

10. The system of claim 5, wherein the status signal includes information obtained by the sensor.

11. The system of claim 1, wherein the base station is further configured to listen on the plurality of transceivers for an incoming field station status.

12. A method for establishing a non-interfering multipath communication system, the method comprising:
    allocating, by a controller in a base station, transmit and receive periods to each transceiver of a plurality of transceivers spaced apart on the base station;
    transmitting, by at least one base station transceiver of the plurality of transceivers, a synchronization signal to a first field station during an allocated transmit period;
    receiving, by the base station during an allocated receive period, a status signal transmitted by the first field station; and
    comparing, by the base station, at least two status signals to determine whether a path to the first field station is blocked.

13. The method of claim 12, further comprising defining, by the base station, transmit and receive periods using a base station clock.

14. The method of claim 12, further comprising defining, by the first field station, transmit and receive periods using a field station clock.

15. The method of claim 14, further comprising synchronizing the field station clock with the base station clock responsive to receiving a base station synchronization signal.

16. The method of claim 12, wherein receiving the status signal further comprises receiving a status signal including information obtained by a sensor on the first field station.

17. The method of claim 12, further comprising establishing a non-interfering multipath communication between one or more of the base station transceivers and the first field station.

18. The method of claim 12, further comprising retransmitting, by the first field station, a signal to a second base station transceiver after determining that a path to a first base station transceiver is blocked.

19. The method of claim 12, further comprising listening, by the base station transceivers, for an incoming field station status.

* * * * *